US010903474B2

(12) United States Patent
Halgasik

(10) Patent No.: US 10,903,474 B2
(45) Date of Patent: Jan. 26, 2021

(54) BATTERY FASTENING SYSTEM FOR UNMANNED AERIAL VEHICLE

(71) Applicant: Microdrones GmbH, Siegen (DE)

(72) Inventor: Jaroslav Halgasik, Freudenberg (DE)

(73) Assignee: MICRODRONES GMBH

( * ) Notice: Subject to any disclaimer, the term of this patent is extended or adjusted under 35 U.S.C. 154(b) by 343 days.

(21) Appl. No.: 15/706,899

(22) Filed: Sep. 18, 2017

(65) Prior Publication Data
US 2020/0407071 A1 Dec. 31, 2020

(30) Foreign Application Priority Data

Sep. 23, 2016 (DE) .................................. EP16190269

(51) Int. Cl.
*H01M 2/34* (2006.01)
(52) U.S. Cl.
CPC ......... *H01M 2/34* (2013.01); *B64C 2201/042* (2013.01); *H01M 2220/20* (2013.01)
(58) Field of Classification Search
CPC ................ H01M 2/34; H01M 2220/20; B64C 2201/042
USPC .......................................................... 429/97
See application file for complete search history.

(56) References Cited

U.S. PATENT DOCUMENTS

| 4,218,107 A * | 8/1980 | Wilson ..................... H01M 2/20 439/342 |
| 4,810,204 A * | 3/1989 | Wilson ................ H01M 2/1022 439/343 |
| 4,822,296 A * | 4/1989 | Wilson ................ H01M 2/1022 439/343 |
| 6,102,725 A * | 8/2000 | Panagiotou ......... H01M 2/1022 439/265 |
| 2011/0301784 A1 | 12/2011 | Oakley et al. |
| 2013/0256464 A1 | 10/2013 | Belik et al. |
| 2014/0061376 A1 | 3/2014 | Fisher et al. |
| 2016/0144734 A1 | 5/2016 | Wang et al. |

FOREIGN PATENT DOCUMENTS

| CN | 206301858 U | * 7/2017 |
| CN | 107074372 A | * 8/2017 |
| CN | 107438566 A | * 12/2017 |
| GB | 2490141 A | 10/2012 |
| KR | 20170030843 A | * 3/2017 |

* cited by examiner

*Primary Examiner* — Sean P Cullen
(74) *Attorney, Agent, or Firm* — Fishman Stewart PLLC

(57) ABSTRACT

The invention relates to an unmanned aerial vehicle with an energy accumulator (20), which is connected releasably to a structural component (29) of the aerial vehicle, and with an accumulator plug (32), via which electrical energy is conducted from the energy accumulator (20) to a rotor drive (18) of the aerial vehicle. In an operating position, a locking element (25) locks the energy accumulator (20) in relation to the structural component (29) and, in a maintenance position, releases the energy accumulator (20), wherein a full engagement of the accumulator plug (32) is blocked at the same time. The invention also relates to an energy accumulator for such an aerial vehicle, and to a method for attaching an energy accumulator to such an aerial vehicle. It can easily be checked by means of the invention whether the energy accumulator has been attached correctly.

7 Claims, 4 Drawing Sheets

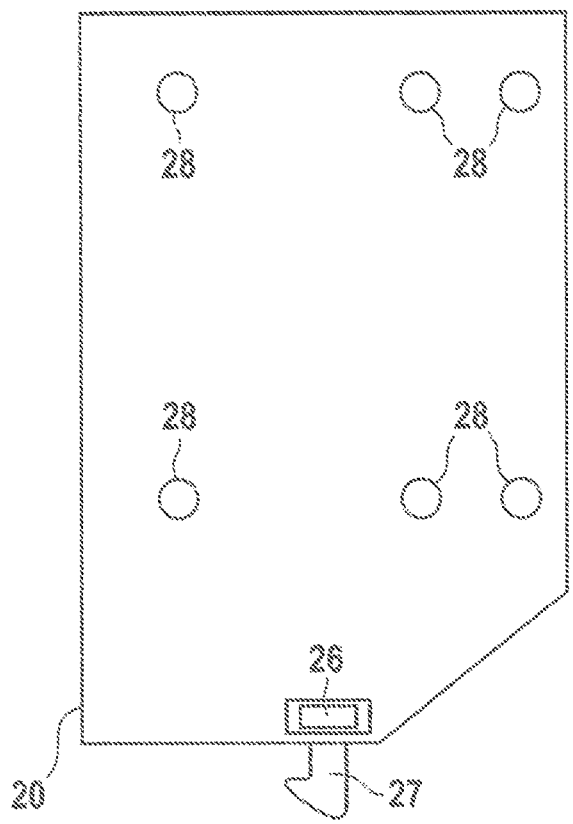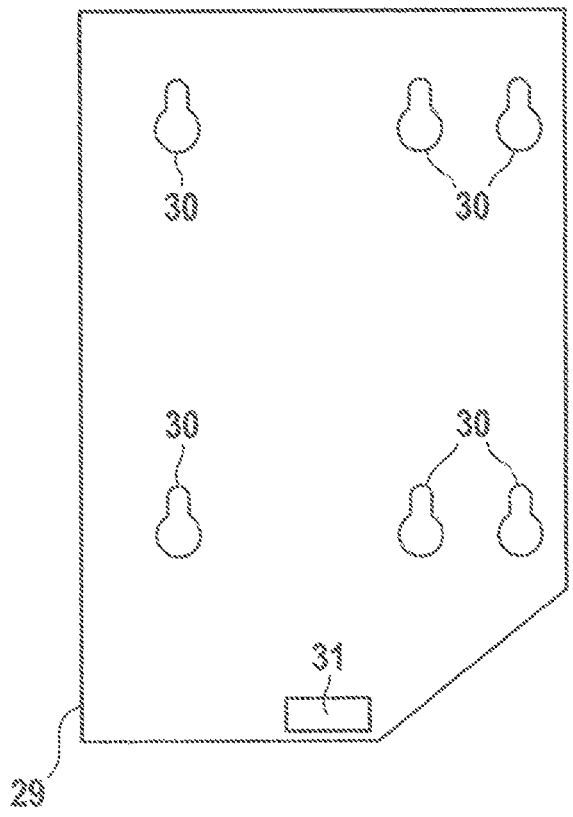
Fig. 3　　　　　　Fig. 4
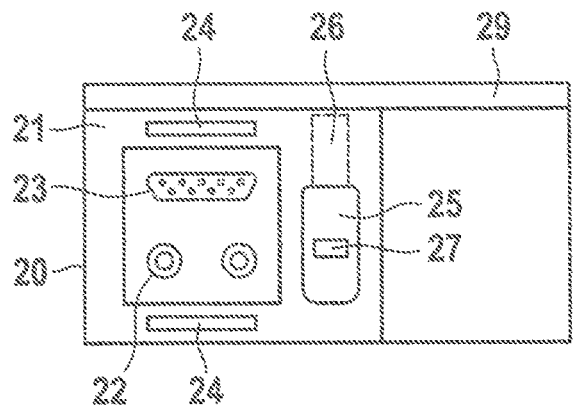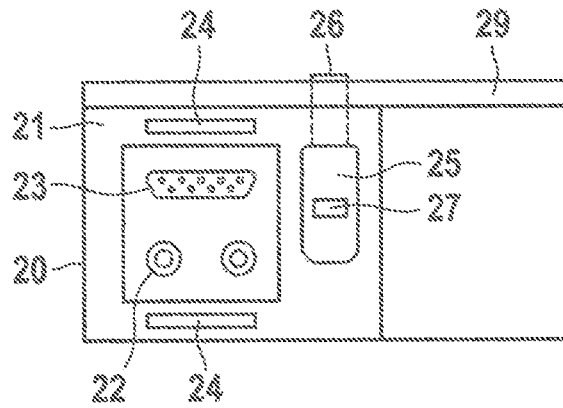
Fig. 5　　　　　　Fig. 6

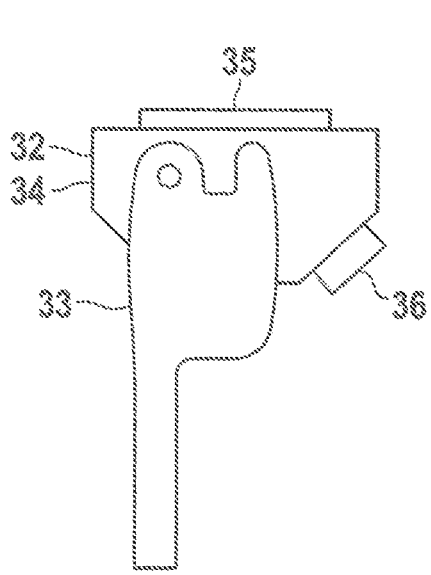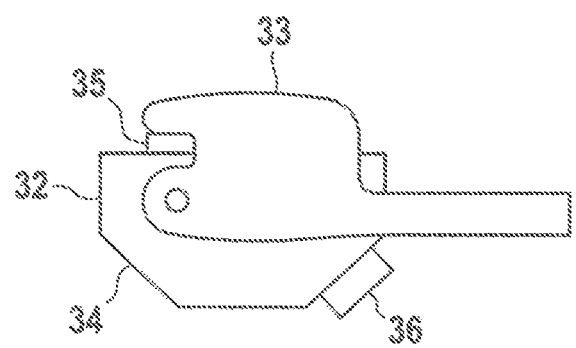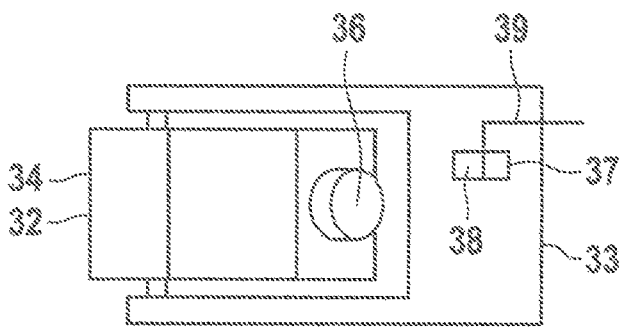
Fig. 7                Fig. 8
Fig. 9

BATTERY FASTENING SYSTEM FOR UNMANNED AERIAL VEHICLE

TECHNICAL FIELD

The invention relates to a battery fastening system for an unmanned aerial vehicle.

SUMMARY OF THE INVENTION

The invention relates to an unmanned aerial vehicle with an energy accumulator, which is connected releasably to a structural component of the aerial vehicle. The aerial vehicle comprises an accumulator plug, via which energy is conducted from the energy accumulator to a rotor drive of the aerial vehicle. In addition, the invention relates to an energy accumulator for such an aerial vehicle, and to a method for attaching an energy accumulator to such an aerial vehicle.

Such unmanned aerial vehicles are used, for example, for monitoring tasks, for camera shots or for transporting small items. The flight duration of the aerial vehicles is limited by the capacity of the energy accumulator. There is a conflict in this respect between the range of the aerial vehicle and the payload. With an increased accumulator capacity, the weight of the energy accumulator is also increased, as a result of which the payload is reduced. In order to be able to fly a plurality of missions shortly one after another, the energy accumulator is connected releasably to a structural component of the aerial vehicle. Thus, during a short temporary landing, the empty energy accumulator can be removed from the aerial vehicle and replaced by a filled energy accumulator.

The exchanging of the energy accumulator basically comprises two aspects. Firstly, the mechanical connection between the energy accumulator and the structural component has to be released or produced. Secondly, the supply connection between the energy accumulator and the structural component, via which supply connection energy can be extracted from the energy accumulator, has to be released or produced. Errors during one of the steps can have serious consequences. Both an error in the mechanical connection and an error in the supply connection can lead to the aerial vehicle crashing.

The invention is based on the object of presenting an aerial vehicle with improved operating safety, and also an associated method and an associated energy accumulator. On the basis of the prior art mentioned, the object is achieved with the features of the independent claims. Advantageous embodiments are specified in the dependent claims.

According to the invention, the aerial vehicle comprises a locking element which, in an operating position, locks the energy accumulator relative to the structural component and which, in a maintenance position, releases the energy accumulator and blocks a full engagement of the accumulator plug. In addition, the aerial vehicle comprises a plug securing mechanism in order to secure the accumulator plug in the connected state, wherein the plug securing mechanism is configured in such a manner that, on its actuating path, it strikes against the locking element when the locking element is in the maintenance position.

The invention has recognized that it is possible with such a locking element to combine a plurality of safety-relevant functions with one another. It is thus not possible to produce a full engagement of the accumulator plug if the energy accumulator has not also been mechanically locked at the same time. By means of the combination of the two safety mechanisms, it can be checked with a glance whether the energy accumulator has been inserted and attached correctly. In particular, the combination of the two safety mechanisms make it possible to reliably prevent the accumulator plug from being unintentionally detached.

A mechanical connection by means of which the energy accumulator is held relative to the structural component can be provided between the energy accumulator and the structural component of the aerial vehicle. The mechanical connection can be configured in such a manner that, starting from the connected state, the energy accumulator first of all carries out a linear movement relative to the structural component in order to be detached from the structural component. The locking element can be configured in such a manner that, in its operating position, it blocks the linear movement and, in its maintenance position, it releases the linear movement.

The mechanical connection can be configured in such a manner that an opening which has a wide portion and a narrow portion is formed in the structural component. A projection of the energy accumulator can be guided through the further region and then displaced along the opening such that the projection engages behind the narrower portion of the opening. For this purpose, the projection of the energy accumulator can be of mushroom-shaped configuration. This means that the projection has a narrower portion which, in the connected state, is arranged in the plane of the opening, and also has a wider portion which is attached to the narrower portion. The direction along which the projection is guided through the openings can be different from the direction by which the projection is displaced along the opening. In particular, the two directions can enclose a right angle with each other.

For a secure connection, the energy accumulator can comprise a plurality of such projections. The structural component can have a plurality of corresponding openings. The projections and the openings can be coordinated with one another in such a manner that all of the projections can be guided in parallel through the wide portions of the openings and, after linear displacement, engage behind the narrow portions of the openings. In particular, the energy accumulator can comprise at least four projections, furthermore preferably six projections. The projections can be arranged along the sides of a rectangle.

The locking element can be connected to the energy accumulator. A sliding guide can be provided, via which the locking element is displaceable relative to the energy accumulator. The sliding guide can be oriented parallel to the projections of the energy accumulator. An opening in which the locking element engages when the latter is in its operating position can be formed in the structural component. When the locking element engages in the opening, the energy accumulator cannot be displaced relative to the structural component, and therefore the energy accumulator is secured in its operating position. With the moving of the locking element into the maintenance position, the locking element can be pulled out of the opening in the structural component, and therefore the energy accumulator can move relative to the structural component.

Energy is extracted from the energy accumulator via an accumulator plug, which can comprise power connections and control connections. The energy for driving the rotors is conducted via the power connections. For example, information regarding the state of the energy accumulator can be transmitted via the control connections. The accumulator plug can comprise a plurality of plug-in contacts which extend in a plugging-in direction. The accumulator plug can be guided in the plugging-in direction up to the energy accumulator in order to bring the accumulator plug into engagement with the connection contacts of the energy accumulator.

It is also possible for information as to whether the energy accumulator has been correctly attached to be transmitted via the control connections. The transmitted information can relate to the mechanical connection and/or to the attachment connection, via which the energy is conducted. The aerial vehicle can comprise sensors, via which the required information is obtained. The aerial vehicle can be configured in such a manner that takeoff is possible only when there is a confirmation regarding the correct attachment of the energy accumulator.

The aerial vehicle can comprise a plug securing mechanism which, in a locked state, secures the accumulator plug, which is attached to the energy accumulator, in said state. The plug securing mechanism can be configured in particular in such a manner that the plug cannot be pulled off from the energy accumulator counter to the plugging-in direction. In an unlocked state, the plug securing mechanism can release the accumulator plug, and therefore the accumulator plug can be pulled off from the energy accumulator counter to the plugging-in direction. The actuating path of the plug securing mechanism denotes a path which the plug securing mechanism or an element of the plug securing mechanism covers between the locked state and the unlocked state.

The plug securing mechanism can be configured in such a manner that it, for its part, is locked in relation to the aerial vehicle when the accumulator plug is in engagement with the energy accumulator and the plug securing mechanism is in the secured state. It is then not possible to bring the plug securing mechanism into the unlocked state without previously opening the securing mechanism of the plug securing mechanism.

A latching element can be provided which is elastically clamped during the locking of the plug securing mechanism and latches as soon as the plug securing mechanism is in the locked state. The securing mechanism of the plug securing mechanism can comprise an oblique surface, along which the latching element is guided during the locking of the plug securing mechanism, in order to elastically clamp the latching element. The securing mechanism of the plug securing mechanism can comprise a manual actuating element in order to clamp the latching element. The manual clamping of the latching element can serve to release the securing mechanism of the plug securing mechanism. After the release of the securing mechanism of the plug securing mechanism, the plug securing mechanism itself can also be released, and therefore the accumulator plug can be pulled off from the energy accumulator.

The latching element can be formed on the locking element. The latching element can project in relation to the locking element in a direction perpendicular to the sliding guide of the locking element. In the maintenance state of the locking element, the latching element can be arranged in such a manner that, when the accumulator plug is brought up to the energy accumulator, an element of the accumulator plug strikes against the latching element before the accumulator plug is in full engagement with the energy accumulator. The latching element can be configured in such a manner that it can latch to the plug securing mechanism only in the operating position of the locking element.

In the operating state of the locking element, the latching lug can be arranged in such a manner that, when the accumulator plug is brought up to the energy accumulator, said latching lug engages behind an element of accumulator plug as soon as the accumulator plug is in full engagement with the energy accumulator. The latching lug can be rigidly connected to the locking element. The accumulator plug can comprise an element which, by contact with the latching lug, is pushed elastically to the side before the latching lug engages behind the element.

The plug securing mechanism can comprise a pivot lever which is mounted pivotably relative to the accumulator plug. The axis of the pivot lever can be oriented perpendicularly to the plugging-in direction of the accumulator plug. The pivot lever can comprise a lug which, in the locked state of the accumulator plug, engages behind an element of the energy accumulator and/or of the structural component of the aerial vehicle. In the locked state of the accumulator plug, the lug can extend substantially perpendicularly to the plugging-in direction of the accumulator plug. In the unlocked state of the accumulator plug, the lug can be oriented substantially parallel to the plugging-in direction. The pivot lever can comprise a first lug and a second lug. The first lug and the second lug can be arranged in such a manner that they enclose the supply contacts of the accumulator plug between them.

The accumulator plug is in full engagement with the energy accumulator when the supply contacts of the accumulator plug have been plugged as far as their end position in the supply contacts of the energy accumulator and the plug securing mechanism is in the locked state. In the released state of the accumulator plug, the plug securing mechanism is in the unlocked state and the supply contacts are completely separated from one another.

Intermediate positions between the full engagement and the released state can be provided, in which the supply contacts are partially in engagement and/or the plug securing mechanism is partially locked. According to the invention, a full engagement of the accumulator plug is not possible as long as the locking element of the energy accumulator is in its maintenance position. This can be achieved by the plug securing mechanism striking on its path from the unlocked state to the finished state against the locking element of the energy accumulator when the locking element is in the maintenance position. The plug securing mechanism can be configured in particular in such a manner that it strikes against the locking element of the energy accumulator before the supply contacts of the accumulator plug come into engagement with the supply contacts of the energy accumulator. For as long as there is no contact, the aerial vehicle cannot be launched. With the locking element of the energy accumulator in the maintenance position, the aerial vehicle is therefore reliably prevented from being able to be put into operation.

The aerial vehicle according to the invention can be configured to receive a first energy accumulator and a second energy accumulator. Each of the energy accumulators can be connected and attached to the aerial vehicle in the manner according to the invention. The energy accumulators can be detached individually from the aerial vehicle and replaced.

The first energy accumulator and the second energy accumulator can be configured symmetrically with respect to each other, and therefore each energy accumulator can optionally be attached either to a first receptacle or a second receptacle of the aerial vehicle. The symmetry can be in particular in such a manner that the connection of the energy accumulator to the first receptacle takes place via an upper side of the energy accumulator, and that the connection of the energy accumulator to the second receptacle takes place via a lower side of the energy accumulator. For this purpose, the energy accumulator can be provided both on its upper side and on its lower side with an arrangement of projections according to the invention. The locking element can be configured in such a manner that it locks in a first position to the structural component when the energy accumulator is attached via its upper side, and that it locks in a second position to the structural component when the energy accumulator is attached via its lower side. Upper side and lower side denote opposite sides without a restriction with regard to the actual orientation of the energy accumulator being associated therewith.

Instead of a second energy accumulator, another device can be connected to the aerial vehicle, wherein the mechanical connection to the structural component can take place in an analogous manner as in the case of the energy accumulator according to the invention. The device can be, for example, a generator with which electrical energy for driving the rotor is provided. The generator can be operated with a fuel. By means of the combination of an energy accumulator according to the invention with a generator, the aerial vehicle can be used more flexibly.

The aerial vehicle can be configured in the manner of a helicopter, in which one or more rotors rotate about a substantially vertical axis. However, the term rotor does not comprise any limitation to a certain orientation of the axis. For example, a propeller with a substantially horizontal axis is also included.

The term energy accumulator is understood as a generic term for various devices in which energy for driving a rotor can be stored. The stored energy can be in particular electrical energy, and therefore the energy accumulator is a battery. The accumulator plug is then a battery plug, and the supply contacts are electric contacts.

The invention also relates to an energy accumulator suitable for such an aerial vehicle. The energy accumulator comprises a locking element which is mounted relative to the energy accumulator via a sliding guide. A latching element is formed on the locking element, said latching element projecting in relation to the locking element in a direction perpendicular to the sliding guide. The energy accumulator can be developed with further measures which are described in conjunction with the aerial vehicle according to the invention or in conjunction with the method according to the invention.

The invention also relates to a method for attaching an energy accumulator to an unmanned aerial vehicle. In the method, an energy accumulator is mechanically connected to the aerial vehicle. A locking element is actuated in order to secure the mechanical connection between the energy accumulator and the aerial vehicle. An accumulator plug is connected to the energy accumulator. A plug securing mechanism is actuated in order to secure the accumulator plug relative to the energy accumulator, wherein actuation of the plug securing mechanism is possible only if the locking element has been actuated previously. The method can be developed with further features which are described in conjunction with the aerial vehicle according to the invention or the battery according to the invention.

The aerial vehicle according to the invention can be developed with further features which are described in conjunction with the method according to the invention or the energy accumulator according to the invention.

BRIEF DESCRIPTION OF THE DRAWINGS

The invention is described by way of example below using advantageous embodiments with reference to the attached drawings, in which:

FIG. 3, shows a view from above of the battery according to FIG. 2;

FIG. 4, shows a view from above of a structural component of the aerial vehicle according to FIG. 1;

FIG. 5, shows a battery according to the invention and a structural component in a side view;

FIG. 6, shows the view according to FIG. 5 in another state of the battery;

FIG. 7, shows a view from above of a battery plug according to the invention;

FIG. 8, shows the view according to FIG. 7 in another state of the battery plug;

FIG. 9, shows a side view of the battery plug according to FIG. 8;

Although the drawings represent embodiments of the present invention, the drawings are not necessarily to scale and certain features may be exaggerated in order to illustrate and explain the present invention. The exemplification set forth herein illustrates an embodiment of the invention, in one form, and such exemplifications are not to be construed as limiting the scope of the invention in any manner.

DESCRIPTION OF THE PREFERRED EMBODIMENT

Figure 1:
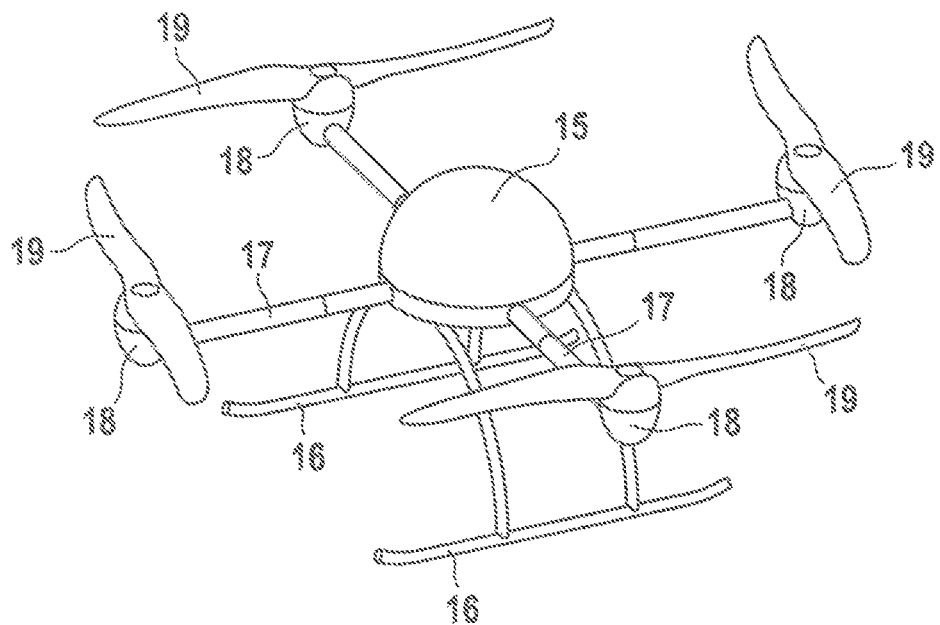
FIG. 1, shows an unmanned aerial vehicle according to the invention.

An unmanned aerial vehicle shown in FIG. 1 comprises a fuselage body 15 with skids 16 on which the aerial vehicle stands when it is on the ground. Four supporting struts 17 extend outward from the fuselage body 15. A drive motor 18 for driving a rotor 19 is arranged on the outer end of each supporting strut 17. For takeoff, the rotors 19 are set in rotation in opposite directions, and therefore the aerial vehicle lifts off vertically upward. By suitable activation of the drive motors 18, the aerial vehicle can then be controlled in a specific manner along desired flight paths.

The drive motors 18 are electric motors. The electrical energy for operation of the drive motors 18 is provided by an energy accumulator in the form of a battery 20 which is accommodated in the interior of the fuselage body 15. Via a control unit of the aerial vehicle (not illustrated), it is ensured that the desired quantity of electrical energy is conducted in each case to the drive motors 18.

The battery 20 comprises a connection plate 21 in which the electric connections of the battery 20 are formed. The electric connections comprise two power connections 22 and a control connection 23 which comprises a plurality of poles. The electrical energy which is conducted to the drive motors 18 is tapped off via the power connections 22. The state of the battery can be monitored via the control connection 23. In particular, the charging state of the battery 20 can be determined via the control connection 23, and therefore it can be ensured that the aerial vehicle lands again in good time before the battery 20 is empty. In addition, information as to whether the battery 20 has been correctly attached both mechanically and electrically can be transmitted via the control connection 23. In addition, two slots 24 which serve to lock a battery plug (not illustrated in FIG. 2) are formed in the connection plate.

Figure 2:
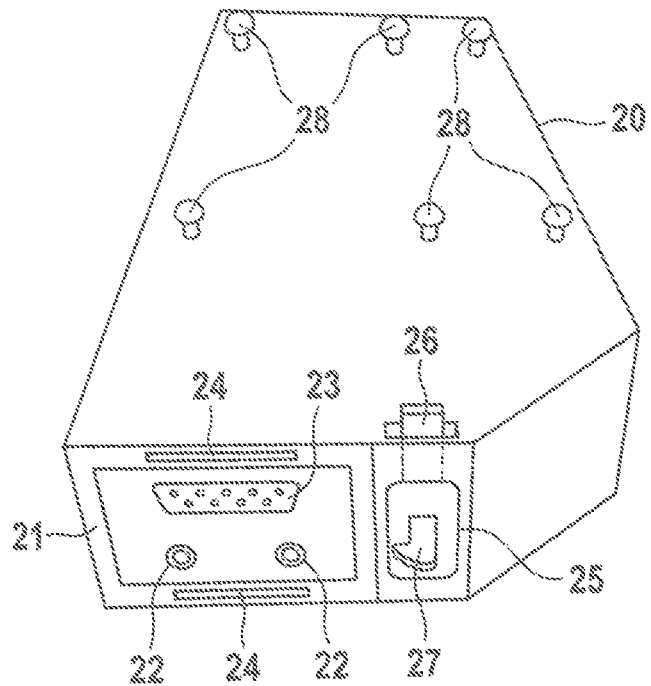
FIG. 2, shows a battery according to the invention.

Referring to FIGS. 2 and 3, the battery 20 also comprises a locking element 25 which is displaceable in the vertical direction relative to the housing of the battery 20. The locking element 25 comprises a latch 26 which projects upward out of the battery housing. In addition, the locking element 25 comprises a latching lug 27 which projects in the lateral direction from the locking element 25. If the locking element 25 is displaced upward or downward, the latch 26 and the latching lug 27 move together with the locking element 25.

In addition, the battery 20 comprises six projections 28 which project upward in a mushroom-shaped manner from the upper side of the battery 20. The projections 28 serve for the mechanical connection to a structural component 29 (shown in FIG. 4) of the aerial vehicle. Openings 30 which are arranged in a pattern matching the projections 28 of the battery 20 are formed in the structural component 29. The openings 30 each comprise a wide portion and a narrow portion which are each oriented in the same direction. The heads of the projections 28 can be guided through the wide portions of the openings 30 and can then be displaced parallel to the structural component 29 in the direction of the narrow portions of the openings 30 such that the heads of the projections 28 engage behind the openings 30. In this state, the battery 20 is mechanically connected to the structural component 29.

To release the battery 20 from the structural component 29, the battery 20 first of all has to be displaced linearly relative to the structural component 29. Said linear movement can be blocked with the locking element 25 of the battery 20, as a result of which unintentional detaching of the battery 20 from the structural component 29 is prevented. For this purpose, the locking element 25 is pushed out of its lower position (FIG. 5) into its upper position (FIG. 6), and therefore the latch 26 engages in an opening 31 of the structural component 29. This corresponds to the mechanical connection between the battery 20 and the structural component 29 when the aerial vehicle according to the invention is ready for flight.

The electric connection between the battery 20 and the aerial vehicle is produced via a battery plug 32 shown in FIGS. 7 to 9. The battery plug 32 is equipped with electric connection contacts 35 which match the battery 20 and are attached via an output 36 of the battery plug 32 to a cable (not illustrated).

The battery plug 32 comprises a pivot lever 33 which is mounted pivotably relative to a plug housing 34. FIG. 7 shows the state of the pivot lever 33, in which the battery plug 32 can be connected to the connection plate 21. FIG. 8 shows the locked state of the battery plug 32, in which the pivot lever 33 is pivoted in such a manner that it can engage behind the slots 24 in the connection plate 21 of the battery 20.

A passage opening 37 is formed in the gripping portion of the pivot lever 33. The passage opening 37 is dimensioned in such a manner that the latching lug 27 of the locking element 25 of the battery 20 can be guided through the passage opening 37. A pin 38 which is mounted movably transversely with respect to its longitudinal direction is arranged in the passage opening 37. If the latching lug 27 is guided through the passage opening 37, the pin 38 is pushed elastically to the side by the latching lug 27 until the latching lug 27 can engage behind the pin 38 and the pin 38 springs back into its starting position. In order to release the latching lug 27 again from the passage opening 37, the pin 38 can be pushed to the side with an actuating element 39, and therefore the pin 38 is no longer engaged behind by the latching lug 27.

In order to connect the battery plug 32 to the battery 20, the battery plug 32 is first of all brought in the plugging-in direction up to the battery 20 in order to bring the electric connection contacts 35 of the battery plug 32 into engagement with the electric connections 22, 23 of the battery 20. The pivot lever 33 here is in the position shown in FIG. 7. In order to lock the battery plug 32, the pivot lever 33 is pivoted into the position shown in FIG. 8, and therefore the pivot lever 33 engages behind the slots 24 in the connection plate 21 of the battery 20. With this movement of the pivot lever 33, the battery plug 32 is pulled further up to the battery 20, and therefore the connection contacts 35 of the battery plug 32 are brought into full engagement with the electric connections 22, 23 of the battery 20. In addition, during this pivoting movement, the latching lug 27 enters into the passage opening 37 of the pivot lever 33 and the latching lug 27 latches behind the pin 38. The battery plug 32 is then securely locked to the battery 20. An unintentional release is not possible.

Figure 10:
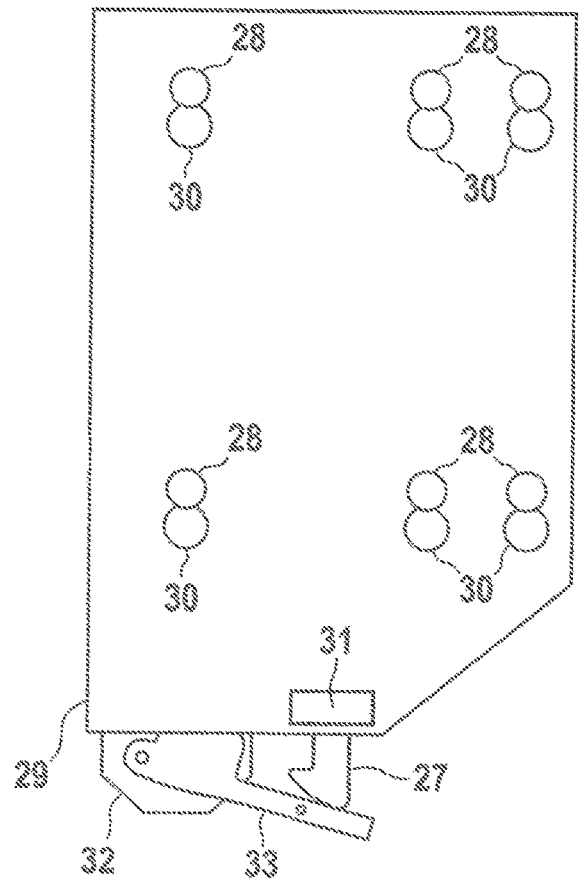
FIG. 10, shows a view from above of the structural component with the battery fastened thereto and with the battery plug in partial engagement.
Figure 11:
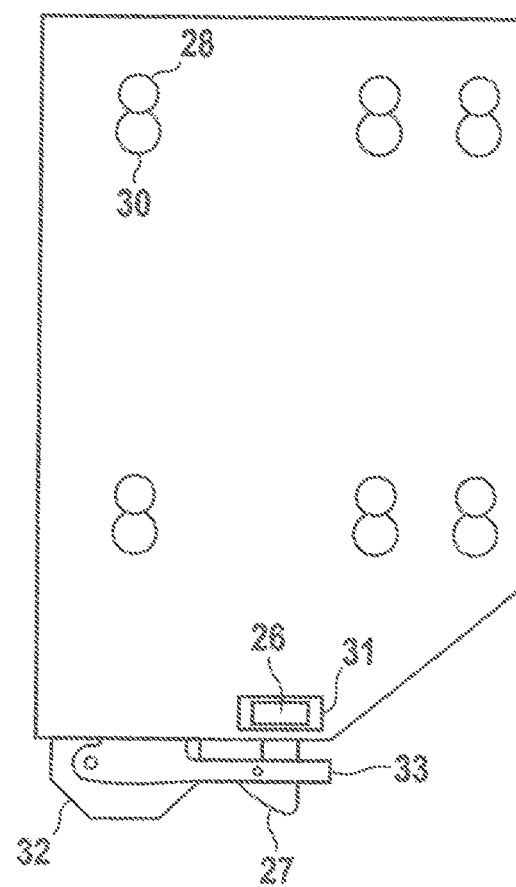
FIG. 11, shows the view according to FIG. 10 with the battery plug in full engagement.

According to FIG. 10, the latching lug 27 cannot engage in the passage opening 37 when the locking element 25 is pushed into its lower position. The pivot lever 33 strikes against the latching lug 27, and a full engagement of the battery plug 32 in the battery 20 is impossible. FIG. 11 shows the state in which the locking element 25 is pushed into its upper position and the latching lug 27 is in engagement with the pivot lever 33. In this state, the battery plug 32 is in full engagement with the battery 20.

When the aerial vehicle according to the invention is used, after a certain flight duration, the information that the energy supply of the battery 20 is running short is transmitted via the control connection 23 of the battery 20. The aerial vehicle will thereupon end its flight and land again. In order to make the aerial vehicle rapidly ready for flight again, an operator can replace the discharged battery 20 for a structurally identical, freshly charged battery 20.

For this purpose, the operator first of all releases a cover from the fuselage body 15 of the aerial vehicle or opens a flap, and therefore the battery 20 arranged in the interior of the fuselage body 15 is accessible. With the actuating element 39, the pin 38 of the battery plug 32 is pushed to the side, and therefore the pivot lever 33 can be released from the latching lug 27. The pivot lever 33 is pivoted into the position shown in FIG. 7, and the battery plug 32 is pulled off from the battery 20 counter to the plugging-in direction.

The locking element 25 of the battery 20 is pushed into its lower position, and therefore the latch 26 no longer engages in the opening 31 of the structural component 29. The battery 20 can then be displaced linearly relative to the structural component 29 and therefore the heads of the projections 28 are arranged in the wide portion of the openings 30. The projections 28 can then be pulled out of the openings 30 in a direction perpendicular to the preceding movement, and therefore the battery is released from the structural component 29.

The structurally identical, freshly charged battery 20 is fastened to the structural component 29 in the reverse sequence. The battery 20 is brought up to the structural component 29 and the projections 28 are brought into engagement with the openings 30. The locking element 25 is pushed into its upper position, and therefore the latch 26 engages in the opening 31 of the structural component 29. The battery plug 32 is brought in the plugging-in direction up to the battery 20, and therefore the electric contacts come into engagement. The pivot lever 33 is pivoted from the position shown in FIG. 7 into the position shown in FIG. 8 in order to lock the battery plug 32 to the battery 20. With the pivoting movement, the latching lug 27 penetrates the pivot lever 33 and latches behind the pin 38.

The latching of the latching lug 27 into the pivot lever 33 requires the locking element 25 of the battery 20 to be pushed into its upper position. If this is not the case, the pivot lever 33 strikes against the latching lug 27 and a full engagement of the battery plug 32 with the battery 20 is impossible. Conversely, this means that a full engagement of the battery plug 32 is ensured when the mechanical connection between the battery 20 and the structural component 29 is completely secured. It is therefore possible by means of the invention for the operator to be able to check with a glance that the battery 20 is correctly connected both mechanically and electrically.

The figures illustrate a hanging installation of the battery 20, in which the battery 20 is suspended on the structural component 29 via the projections 28. A horizontal installation of the battery, in which the battery 20 rests on the structural component 29, or a vertical installation, in which the battery 20 hangs laterally on the structural component 29, is likewise readily possible. The arrangement of the elements is then substantially reversed from that illustrated in the figures or rotated by 90° in comparison to the illustration in the figure.

It is to be understood that the invention has been described with reference to specific embodiments and variations to provide the features and advantages previously described and that the embodiments are susceptible of modification as will be apparent to those skilled in the art.

Furthermore, it is contemplated that many alternative, common inexpensive materials can be employed to construct the basis constituent components. Accordingly, the forgoing is not to be construed in a limiting sense.

The invention has been described in an illustrative manner, and it is to be understood that the terminology, which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for illustrative purposes and convenience and are not in any way limiting, the invention, which is defined by the following claims as interpreted according to the principles of patent law, including the Doctrine of Equivalents, may be practiced otherwise than is specifically described.

The invention claimed is:

1. A battery fastening system for an unmanned aerial vehicle comprising:
    a rechargeable battery forming a planar mounting surface defining a first outer perimeter and a plurality of mushroom shaped projections attached to and extending outwardly from said planar mounting surface in a fixed array;
    a structural component integrally affixed to said unmanned aerial vehicle, said structural component defining a planar attachment surface dimensioned, shaped and forming a second outer perimeter similar to said planar mounting surface, and defining a plurality of key hole shaped openings, each opening having a wide portion and a narrow portion narrower than the wide portion, and disposed in an array mimicking said mushroom shaped projections, whereby upon mounting of said battery to said structural component, each mushroom shaped projection extends through and self-engages an associated one of the plurality of key hole shaped openings when the outer perimeters of said mounting surface and said planar attachment surface are aligned,
    said battery forming a planar connection plate disposed normally to said planar mounting surface;
    a locking element carried by said connection plate for selective sliding displacement between a release or maintenance position enabling relative sliding displacement of said battery and said structural component and a locking or operating position preventing relative linear movement and removal of the battery from said structural component, said locking element forming a latch member which is spaced from said structural component when said locking element is in said release position and which extends through a registering opening formed in said structural component when said locking element is in said locking position,
    said locking element further comprising a latch lug extending normally outwardly from said connection plate,
    said battery further comprising control and power connectors and at least one battery plug attachment slot emerging through said connecting plate adjacent said locking element; and
    a battery plug assembly including a housing, control and power connectors, the battery being interconnectable with unmanned aerial vehicle power consuming devices,
    said battery plug assembly further comprising a pivot lever rotatably connected to said housing for positioning between a released position where said battery plug assembly can manually be removed from said battery and an engaged position wherein said pivot lever self-engages said at least one battery plug attachment slot in said connection plate, and
    said pivot lever includes a through passage opening registering with said latch lug when said locking element is in said locking position, and preventing the pivot lever fully engaging with the connection plate when said locking element is in said release position,
    whereby said battery can be fully installed upon said structural component only (1.) when the mushroom shaped projections are each fully engaged within the narrow portion of their respective key hole shaped openings, (2.) the locking element is positioned in the locking position with the latch member extending through the structural component opening and (3.) the latch lug extends fully through and engages the pivot lever passage opening.

2. The battery fastening system of claim 1, wherein the locking element is connected to the connection plate of the battery via a sliding guide member.

3. The battery fastening system of claim 1, wherein said sliding locking element is oriented parallel to the battery mushroom shaped projections.

4. The battery fastening system of claim 1, wherein said array of mushroom shaped projections extends generally about the outer perimeter of said planar mounting surface.

5. The battery fastening system of claim 1, wherein the battery is configured to be connected either via an upper side of the battery to a first receptacle of the structural component or via a lower side of the battery to a second receptacle of the structural component.

6. The battery fastening system of claim 1, wherein said pivot lever includes a manual release pin laterally displaceable between a first position engaging said latch lug and a second position releasing said latch lug.

7. The battery fastening system of claim 6, wherein said pivot lever includes a manual actuating element operable to displace said pin between said first and second positions.

* * * * *

UNITED STATES PATENT AND TRADEMARK OFFICE
CERTIFICATE OF CORRECTION

PATENT NO. : 10,903,474 B2
APPLICATION NO. : 15/706899
DATED : January 26, 2021
INVENTOR(S) : Jaroslav Halgasik Page 1 of 1

It is certified that error appears in the above-identified patent and that said Letters Patent is hereby corrected as shown below:

On the Title Page

Item (30) should read as follows:
Sep. 23, 2016 (EP).... EP16190269.7

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*